US009368786B2

(12) United States Patent
Lee et al.

(10) Patent No.: US 9,368,786 B2
(45) Date of Patent: Jun. 14, 2016

(54) POSITIVE ACTIVE MATERIAL AND LITHIUM BATTERY INCLUDING THE SAME

(75) Inventors: Young-Hun Lee, Yongin-si (KR); Jay-Hyok Song, Yongin-si (KR); Ick-Kyu Choi, Yongin-si (KR); Young-Ki Kim, Yongin-si (KR); Soon-Rewl Lee, Yongin-si (KR); Yu-Mi Song, Yongin-si (KR); Yoon-Chang Kim, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 1280 days.

(21) Appl. No.: 13/184,294

(22) Filed: Jul. 15, 2011

(65) Prior Publication Data

US 2012/0037846 A1 Feb. 16, 2012

Related U.S. Application Data

(60) Provisional application No. 61/373,691, filed on Aug. 13, 2010.

(51) Int. Cl.
*H01M 4/525* (2010.01)
*H01M 4/131* (2010.01)
*H01M 4/36* (2006.01)
*H01M 4/48* (2010.01)
*H01M 10/052* (2010.01)

(52) U.S. Cl.
CPC .............. *H01M 4/131* (2013.01); *H01M 4/362* (2013.01); *H01M 4/48* (2013.01); *H01M 4/525* (2013.01); *H01M 10/052* (2013.01); *Y02E 60/122* (2013.01)

(58) Field of Classification Search
CPC ...... H01M 4/525; H01M 4/485; H01M 4/505
USPC .................. 252/518.1, 182.1, 521.2; 429/322
See application file for complete search history.

(56) References Cited

U.S. PATENT DOCUMENTS

| | | | |
|---|---|---|---|
| 6,416,560 B1 | 7/2002 | Palmgren | |
| 6,746,630 B2 | 6/2004 | Rooney | |
| 8,404,001 B2* | 3/2013 | Kuriki | 29/25.03 |
| 2002/0018935 A1* | 2/2002 | Okada | 429/231.95 |
| 2003/0180615 A1 | 9/2003 | Johnson et al. | |
| 2004/0258836 A1 | 12/2004 | Besenhard et al. | |
| 2006/0046143 A1 | 3/2006 | Nakai et al. | |
| 2006/0093871 A1* | 5/2006 | Howard et al. | 429/9 |
| 2006/0093873 A1* | 5/2006 | Howard et al. | 429/9 |
| 2006/0093923 A1 | 5/2006 | Howard et al. | |
| 2007/0259267 A1 | 11/2007 | Ota et al. | |
| 2009/0117463 A1 | 5/2009 | Takezawa et al. | |
| 2010/0148115 A1 | 6/2010 | Chang et al. | |
| 2012/0043500 A1* | 2/2012 | Xiang et al. | 252/182.1 |
| 2012/0295162 A1* | 11/2012 | Caillon et al. | 429/221 |

FOREIGN PATENT DOCUMENTS

| | | |
|---|---|---|
| EP | 1391950 A1 | 2/2004 |
| EP | 2471133 A | 7/2012 |
| JP | 06-290780 A | 10/1994 |
| JP | 11-016566 | 1/1999 |
| JP | 11-144734 | 5/1999 |
| JP | 2009-146811 | 7/2009 |
| JP | 2010-170715 | 8/2010 |
| JP | 4712711 B2 | 4/2011 |
| KR | 1995-7004442 A | 11/1995 |
| KR | 2002-0034194 | 5/2002 |
| KR | 2003-0033913 | 5/2003 |
| KR | 10-2006-0050755 A | 5/2006 |
| KR | 10-2007-0008115 A | 1/2007 |
| KR | 1020070032358 A | 3/2007 |
| KR | 10-2010-0030612 A | 3/2010 |
| WO | WO 2006068143 A1 * | 6/2006 |
| WO | WO 2007072595 A1 * | 6/2007 |
| WO | WO 2007072596 A1 * | 6/2007 |
| WO | WO 2011/031544 A | 3/2011 |

OTHER PUBLICATIONS

Auborn, J. J., et al., "Lithium intercalation cells without metallic lithium", Journal of the Electrochemical Society (1987), 134(3), 638-641 (Abstract).*

Auborn, J.J., et al., "Lithium intercalation cells without metallic lithium", Journal of the Electrochemical Society (1987), 134(3), 638-641.*

Reddy M.V. et al, "Cathodic behaviour of NiO-coated LiO2", Electrochimica Acta, May 30, 2005, vol. 50, pp. 3375-3382, Elsevier Science.

European Office Action dated Nov. 4, 2013, issued by the European Patent Office, in 9 pages.

Extended European Search Report issued by the European Patent Office dated Dec. 6, 2012, 11 pages.

George Ting-Kuo Fey, Y.Y. Lin, T. Prem Kumar, Enhanced cyclability and thermal stability of LiCoO2 coated with cobalt oxides, 2005, 68-75, vol. 191, Surface & Coatings Technology.

Jaephil Cho, Tae-Joon Kim, Yong Jeong Kim and Byungwoo Park, Complete blocking of $Mn^{3+}$ ion dissolution from a $LiMn_2O_4$ coating, Journal, 2001, 1074-1075, The Royal Society of Chemistry.

P.G. Balakrishnan, R. Ramesh, T. Prem Kumar, Safety mechanisms in lithium-ion batteries, Journal, 2006, 401-414, vol. 155, Journal of Power Sources.

Notice of Allowance issued by the Korean Intellectual Property Office on Apr. 12, 2013 in Korean Patent Application No. 10-2011-0068548, which corresponds to captioned U.S. Appl. No. 13/184,294, in 5 pages.

Office Action issued by the Japanese Patent Office on May 7, 2013 in Japanese Patent Application No. 2011-174545, which corresponds to captioned U.S. Appl. No. 13/184,294, in 3 pages.

(Continued)

*Primary Examiner* — Douglas Mc Ginty
(74) *Attorney, Agent, or Firm* — Knobbe Martens Olson & Bear LLP

(57) ABSTRACT

A positive active material including a lithium composite oxide and a transition metal oxide including a transition metal having an oxidation number smaller than an oxidation number when the transition metal is in the most stable state hinders generation of oxygen occurring during charging and provides a lithium battery with high-temperature preservation characteristics and high stability.

8 Claims, 2 Drawing Sheets

(56) References Cited

OTHER PUBLICATIONS

Chinese Office Action dated Aug. 15, 2014, issued in corresponding Chinese Application No. 2011-10222338.8.
Second Office Action issued Apr. 13, 2015, in corresponding Chinese Patent Application No. 201110222338.8.
Examination Report issued Apr. 22, 2015, in corresponding European Patent Application No. 2418719.
Office Action mailed Oct. 23, 2015, issued in corresponding CN Application No. 201110222338.8.

* cited by examiner

POSITIVE ACTIVE MATERIAL AND LITHIUM BATTERY INCLUDING THE SAME

CROSS-REFERENCE TO RELATED APPLICATIONS

This application claims the benefit of U.S. Provisional Patent Application No. 61/373,691, filed on Aug. 13, 2010, in the U.S. Patent and Trademark Office, the disclosure of which is incorporated herein in its entirety by reference.

BACKGROUND

1. Field

A positive active material and a lithium battery including the same are provided.

2. Description of the Related Art

Demand for lithium secondary batteries for use in portable electronic devices for information communications such as personal digital assistants (PDAs), mobile phones, or notebook computers, electrical bicycles, and electrical vehicles is increasing, and development of small and lightweight electrical devices has lead to commercialization of small lithium batteries that can be charged and discharged with high capacity.

A typical lithium battery includes a positive electrode, a negative electrode, each of which includes an active material enabling intercalation and deintercalation of lithium ions, and an organic electrolytic solution or a polymer electrolytic solution which fills a space between the positive electrode and the negative electrode, and generates an electrical energy due to an oxidation-reduction reaction occurring when lithium ions are intercalated into and/or deintercalated from the positive electrode and the negative electrode.

Lithium batteries have higher voltage and higher energy density than conventional batteries.

However, currently available lithium batteries including lithium cobalt oxide ($LiCoO_2$), lithium nickel oxide ($LiNiO_2$), or lithium nickel cobalt manganese oxide ($Li[NiCoMn]O_2$, $Li[Ni_{1-x-y}Co_xM_y]O_2$) as a positive active material are unstable because the positive active materials generate a great amount of heat during charging and discharging.

Accordingly, there have been efforts to improve battery stability by adding an additive such as $TiO_2$ and a benzene compound to $LiCoO_2$ that constitutes a positive active material to prevent an excess current and a thermal runaway phenomenon due to the excess current, or by using a small amount of an aromatic compound.

However, such methods are inappropriate for preventing lifetime deterioration and gas formation that occurs by decomposition of an electrolyte during charging and discharging, and ultimately cannot prevent a decrease in stability such as ignition and exploration of batteries although battery stability may be improved in a limited temperature or voltage range.

SUMMARY

An aspect of the present embodiments provides a positive active material with high-temperature preservation characteristics and high stability.

Another aspect of the present embodiments provides a lithium battery including an active material with high-temperature preservation characteristics and high stability.

According to an embodiment, there is provided a positive active material including a lithium composite oxide and a transition metal oxide, wherein the transition metal oxide includes a transition metal having an oxidation number smaller than an oxidation number when the transition metal is in the most stable state.

The transition metal oxide may be present in admixture with the lithium composite oxide.

In the positive active material, at least a portion of the lithium composite oxide is coated with the transition metal oxide.

The transition metal oxide may be an oxide of at least one metal selected from the group consisting of Ti, V, Mn, Fe, Co, Mo, W, and Ni.

The transition metal oxide may include at least one selected from the group consisting of $Ti_2O_3$, TiO, $VO_2$, $V_2O_3$, VO, $Mn_2O_3$, MnO, FeO, $CO_2O_3$, CoO, $CO_3O_4$, $Mo_2O_5$, $MoO_2$, $Mo_2O_3$, MoO, $W_2O_5$, $WO_2$, $W_2O_3$, and NiO.

The transition metal oxide may be $MoO_2$, $WO_2$, $CO_3O_4$, or a mixture thereof.

The amount of the transition metal oxide may be in the range of 0.05 through 15 parts by weight based on 100 parts by weight of the lithium composite oxide.

The amount of the transition metal oxide may be in the range of 0.1 through 10 parts by weight based on 100 parts by weight of the lithium composite oxide.

According to another embodiment, there is provided a lithium battery including a positive electrode including the positive active material described above; a negative electrode; and an electrolytic solution.

A positive active material including a lithium composite oxide and a transition metal oxide including a transition metal having an oxidation number smaller than an oxidation number when the transition metal is in the most stable state, or a positive active material including a lithium composite oxide and a transition metal oxide wherein at least a portion of the lithium composite oxide is coated with the transition metal oxide hinders generation of oxygen occurring during charging and provides a lithium battery with high-temperature preservation characteristics and high stability.

DETAILED DESCRIPTION OF THE PREFERRED EMBODIMENT

Figure 1:
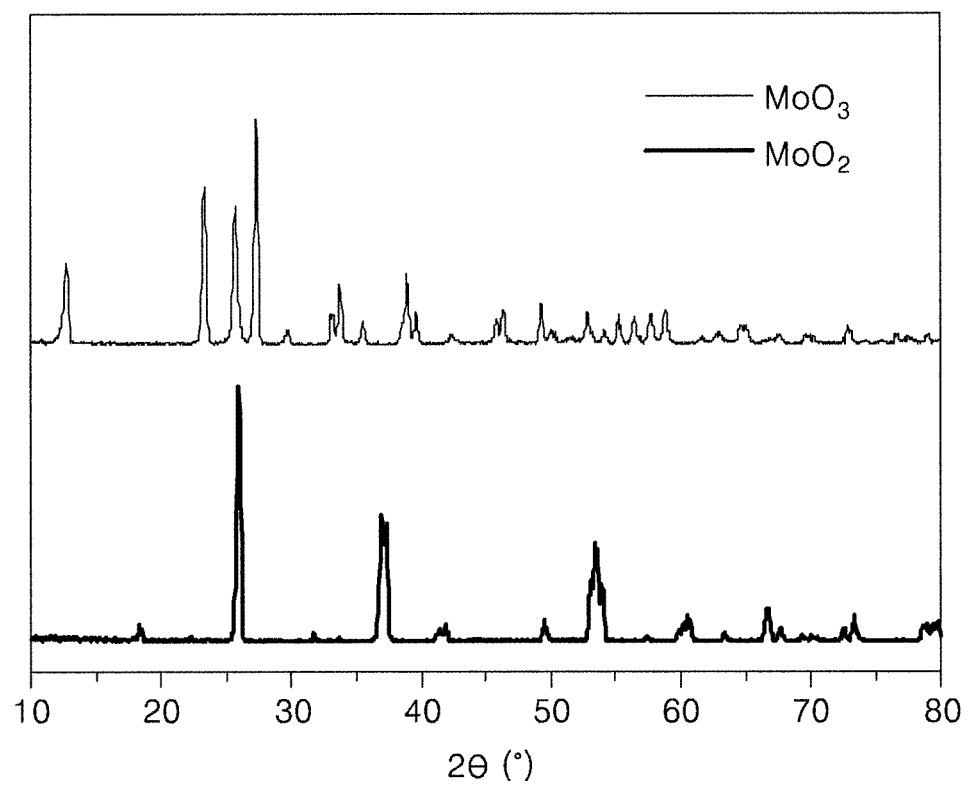
FIG. 1 is a graph showing XRD results of $MoO_3$ and $MoO_2$ transition metal oxides.

Hereinafter, embodiments will be described in detail. The embodiments are presented for illustrative purpose only and do not limit the present embodiments, and the present embodiments are defined only by claims which will be described later.

A positive active material according to an embodiment includes a lithium composite oxide and a transition metal oxide including a transition metal having an oxidation number smaller than an oxidation number when the transition metal is in the most stable state.

In the transition metal oxide, the transition metal may have an oxidation number in the range of 2+ through 5+.

The term "most stable state" as used herein means when an oxide of the corresponding transition metal has the lowest standard generation enthalpy ($\Delta H°_f$) at a temperature of 25° C. under 1 atm among corresponding transition metal binary oxides represented by $M_xO_y$.

According to an embodiment, in the positive active material, the transition metal oxide is an oxygen-deficiency transition metal oxide having oxygen vacancy formed by removing one or less oxygen therefrom, for example, an oxide having a ratio of y/x smaller than that of an oxide having the lowest standard generation enthalpy ($\Delta H°_f$) at a temperature of 25° C. under 1 atm among corresponding transition metal binary oxides represented by $M_xO_y$, wherein the ratio of y/x is a positive value.

For example, in regard to Ti, V, Mn, Fe, Co, Mo, W, and Ni, the most stable states of oxides of the respective transition metals may be $TiO_2$, $V_2O_5$, $MnO_2$, $Fe_2O_3$, $CoO_2$, $MoO_3$, $WO_3$, and $Ni_2O_3$, and the oxidation numbers of the transition metals contained in the transition metal oxides may be Ti(4+), V(5+), Mn(4+), Fe(3+), Co(4+), Mo(6+), W(6+), and Ni(3+).

The transition metal oxide may be prepared by heat treating the corresponding transition metal oxide in the most stable state in a reducing atmosphere to remove oxygen.

For example, the transition metal oxide may be prepared by heat treating the corresponding transition metal oxide in the most stable state in a reducing atmosphere including $H_2$ gas, $H_2/N_2$ gas (a mixed gas including 5 volume % of $H_2$ gas and 95 volume % of $N_2$), or $NH_3$ gas for 10 through 20 hours at a temperature of from about 1000 through about 1500° C. Alternatively, the transition metal oxide may be prepared by heat treating the corresponding transition metal oxide in the most stable state by using a reducing agent such as a borohydride, hydrazine, or $NaPH_2O_2$.

The positive active material adsorbs oxygen generated from the transition metal oxide and prevents generation of oxygen in a positive electrode including the positive active material.

Accordingly, a battery including the positive active material including the transition metal may have excellent thermal stability and cycle characteristics even when the battery is thermally exposed or over-charged, or during combustion.

In the positive active material, at least a portion of a surface of the lithium composite oxide may be coated with the transition metal oxide.

The coating may be performed by dipping the lithium composite oxide in a coating solution of the transition metal oxide. However, the coating is not limited thereto. For example, the coating may also be performed by solvent evaporation, co-precipitation, zol-gel method, filtering after adsorption, sputtering, or chemical vapor deposition (CVD).

The transition metal oxide may include at least one kind of metal selected from the group consisting of Ti, V, Mn, Fe, Co, Mo, W, and Ni.

Examples of the transition metal oxide may also include mixtures or alloys of at least two kinds of the metals described above.

In the transition metal oxide, for example, the oxidation number of the transition metal may be Ti(3+, 2+), V(4+, 3+, 2+), Mn(3+, 2+), Fe(2+), Co(3+, 2+), Mo(5+, 4+, 3+, 2+), W(5+, 4+, 3+), or Ni (2+).

The transition metal oxide may include at least one oxide selected from the group consisting of $Ti_2O_3$, TiO, $VO_2$, $V_2O_3$, VO, $Mn_2O_3$, MnO, FeO, $CO_2O_3$, CoO, $CO_3O_4$, $Mo_2O_5$, $MoO_2$, $Mo_2O_3$, MoO, $W_2O_5$, $WO_2$, $W_2O_3$, and NiO.

For example, the transition metal oxide may be TiO, $V_2O_3$, MnO, FeO, $CO_3O_4$, $MoO_2$, $WO_2$, or NiO. For example, the transition metal oxide may be $MoO_2$, $WO_2$, or $CO_3O_4$.

The oxidation state of the transition metal in the transition metal oxide may easily be in a lower oxidation state than the most stable oxidation state of the transition metal.

The amount of the transition metal oxide may be from about 0.05 through about 15 parts by weight, or from about 0.1 through about 10 parts by weight, or from about 0.1 through about 5 parts by weight, based on 100 parts by weight of the lithium composite oxide.

If the amount of the transition metal oxide is within the ranges described above, even when a Li intercalation potential is increased, a battery including the transition metal oxide has an optimal capacity and thus has high thermal stability and high capacity without a decrease in charge and discharge characteristics.

A positive electrode of a lithium battery according to an embodiment includes a positive active material including a lithium composite oxide and a transition metal oxide including a transition metal having an oxidation number smaller than an oxidation number when the transition metal is in the most stable state.

The positive electrode may include a current collector and a positive active material layer.

The positive active material layer may include the positive active material including the lithium composite oxide and the transition metal oxide including a transition metal having an oxidation number smaller than an oxidation number when the transition metal is in the most stable state.

A detailed description of the positive active material is presented above.

The positive active material layer may further include, in addition to the positive active material including the lithium composite oxide and the transition metal oxide, a first compound (lithiated intercalation compound) enabling reversible intercalation and deintercalation of lithium ions. Examples of the first compound are as follows:

$Li_aA_{1-b}X_bD_2$ where $0.95 \leq a \leq 1.1$, and $0 \leq b \leq 0.5$; $Li_aE_{1-b}X_bO_{2-c}D_c$ where $0.95 \leq a \leq 1.1$, $0 \leq b \leq 0.5$, and $0 \leq c \leq 0.05$; $LiE_{2-b}X_bO_{4-c}D_c$ where $0 \leq b \leq 0.5$, and $0 \leq c \leq 0.05$; $Li_aNi_{1-b-c}Co_bBcD_\alpha$ where $0.95 \leq a \leq 1.1$, $0 \leq b \leq 0.5$, $0 \leq c \leq 0.05$, and $0 < \alpha \leq 2$; $Li_aNi_{1-b-c}Co_bX_cO_{2-\alpha}M_\alpha$ where $0.95 \leq a \leq 1.1$, $0 \leq b \leq 0.5$, $0 \leq c \leq 0.05$, and $0 < \alpha < 2$; $Li_aNi_{1-b-c}Co_bX_cO_{2-\alpha}M_2$ where $0.95 \leq a \leq 1.1$, $0 \leq b \leq 0.5$, $0 \leq c \leq 0.05$, and $0 < \alpha < 2$; $Li_aNi_{1-b-c}Mn_bX_cD_\alpha$ where $0.95 \leq a \leq 1.1$, $0 \leq b \leq 0.5$, $0 \leq c \leq 0.05$, and $0 < \alpha \leq 2$; $Li_aNi_{1-b-c}Mn_b X_cO_{2-\alpha}M_\alpha$ where $0.95 \leq a \leq 1.1$, $0 \leq b \leq 0.5$, $0 \leq c \leq 0.05$, and $0 < \alpha < 2$; $Li_aNi_{1-b-c}Mn_bX_cO_{2-\alpha}M_2$ where $0.95 \leq a \leq 1.1$, $0 \leq b \leq 0.5$, $0 \leq c \leq 0.05$, and $0 < \alpha < 2$; $Li_aNi_bE_cG_dO_2$ where $0.90 \leq a \leq 1.1$, $0 \leq b \leq 0.9$, $0 \leq c \leq 0.5$, and $0.001 \leq d \leq 0.1$; $Li_aNi_bCo_cMn_dG_eO_2$ where $0.90 \leq a \leq 1.1$, $0 \leq b \leq 0.9$, $0 \leq c \leq 0.5$, $0 \leq d \leq 0.5$, and $0 \leq e \leq 0.1$; $Li_aNiG_bO_2$ where $0.90 \leq a \leq 1.1$, and $0.001 \leq b \leq 0.1$; $Li_aCoG_bO_2$ where $0.90 \leq a \leq 1.1$, and $0.001 \leq b \leq 0.1$; $Li_aMnG_bO_2$ where $0.90 \leq a \leq 1.1$, and $0.001 \leq b \leq 0.1$; $Li_aMn_2G_bO_4$ where $0.90 \leq a \leq 1.1$, and $0 \leq b \leq 0.1$; $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$. The first compound may also be lithium titanate.

In the chemical structures of the first compounds shown above, A is selected from the group consisting of Ni, Co, Mn, and a combination thereof, but is not limited thereto; X is selected from the group consisting of Al, Ni, Co, Mn, Cr, Fe, Mg, Sr, V, a rare-earth element, and a combination thereof, but is not limited thereto; D is selected from the group consisting of O, F, S, P, and a combination thereof, but is not limited thereto; E is selected from the group consisting of Co, Mn, and a combination thereof, but is not limited thereto; M is selected from the group consisting of F, S, P, and a combination thereof, but is not limited thereto; G is selected from the group consisting of Al, Cr, Mn, Fe, Mg, La, Ce, Sr, V, and a combination thereof, but is not limited thereto; Q is selected from the group consisting of Ti, Mo, Mn, and a combination thereof, but is not limited thereto; Z is selected from the group consisting of Cr, V, Fe, Sc, Y, and a combination thereof, but is not limited thereto; and J is selected from the group consisting of V, Cr, Mn, Co, Ni, Cu, and a combination thereof, but is not limited thereto.

The positive active material layer may further include a binder.

The binder included in the positive active material layer allows positive active material particles to attach to each other and attaches the positive active material to the current collector. Examples of the binder include polyvinylalcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinyllidene fluoride, polyethylene, polypropylene, styrene butadiene rubber, acrylated styrene-butadiene rubber, epoxy resin, and nylon. However, the binder is not limited thereto.

The current collector may comprise Al or Cu, but is not limited thereto.

The positive active material, the binder, and a conducting agent, of which use is optional, are mixed in a solvent to prepare a composition for forming the positive active material layer and then, the composition is coated on the current collector to form the positive active material layer. The solvent may comprise N-methylpyrrolidone, but is not limited thereto.

A negative electrode may include a negative active material layer and a current collector.

The transition metal oxide may also be used in a negative active material.

The negative active material may be natural graphite, silicon/carbon composite ($SiO_x$), silicon metal, a silicon thin film, lithium metal, lithium alloy, a carbonaceous material, or graphite. An example of the lithium alloy may be lithium titanate. The lithium titanate can be categorized into a spinel-type lithium titanate, an anatase-type lithium titanate, and a ramsdellite-type lithium titanate, according to a crystal structure. For example, the negative active material may be represented by $Li_{4-x}Ti_5O_{12}$ ($0 \leq x \leq 3$). For example, the negative active material may be $Li_4Ti_5O_{12}$, but is not limited thereto.

A composition for forming the negative active material layer may include a binder and a solvent. The binder and the solvent may be the same as those used in the positive electrode above. The composition for forming the negative active material layer may selectively include a conducting agent including at least one selected from the group consisting of carbon black, ketjen black, acetylene black, artificial graphite, natural graphite, copper powder, nickel powder, aluminum powder, silver powder, and polyphenylene. However, the example of the conducting agent is not limited thereto.

A plasticizer may be further added to the composition for forming the positive active material layer and the composition for forming the negative active material composition layer to form pores in electrode plates.

An electrolytic solution may include a non-aqueous organic solvent and a lithium salt.

The non-aqueous organic solvent may function as a medium in which ions participating in an electrochemical reaction in a battery migrate.

Examples of the non-aqueous organic solvent include a carbonate-based solvent, an ester-based solvent, an ether-based solvent, a ketone-based solvent, an alcohol-based solvent, and a non-proton type solvent. Examples of a carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), and butylene carbonate (BC). Examples of an ester-based solvent include methyl acetate, ethyl acetate, n-propyl acetate, dimethylacetate, methylpropionate, ethylpropionate, γ-butyrolactone, decanolide, valerolactone, mevalonolactone, and caprolactone. Examples of an ether-based solvent include dibutyl ether, tetraglyme, diglyme, dimethoxyethane, 2-methyltetrahydrofurane, and tetrahydrofurane. Examples of a ketone-based solvent include cyclohexanone. Examples of an alcohol-based solvent include ethyl alcohol and isopropyl alcohol. Examples of a non proton-type solvent include nitriles such as R—CN (R is a linear, branched, or cyclic C2 to C20 hydrocarbonate group and has a double bond-direction cyclic or ether bond), amides such as dimethylformamide, dioxolanes such as 1,3-dioxolane, and sulfolanes.

The non-aqueous organic solvent may be a single solvent or a mixture of two or more solvents. When the non-aqueous organic solvent is a mixture of two or more solvents, a mixture ratio of the solvents may be appropriately controlled according to battery performance.

The lithium salt is dissolved in an organic solvent, and functions as a lithium ion supplier in a battery, enables a basic operation of a battery, and facilitates migration of lithium ions between the positive electrode and the negative electrode. The lithium salt may include at least one supporting electrolytic salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ where x and y are natural numbers, LiCl, LiI, and $LiB(C_2O_4)_2$(lithium bis(oxalato)borate; LiBOB). The concentration of the lithium salt may be from about 0.1 M to about 2.0 M. When the concentration of the lithium salt is within the ranges described above, the electrolytic solution obtains appropriate conductivity and viscosity and lithium ions may effectively migrate.

According to the kind of a lithium battery, a separator may be present between the positive electrode and the negative electrode. The separator may be a monolayer or two or more-layer of polyethylene, polypropylene, or polyvinylidene fluoride, and may also be a mixed multi-layer, such as a two-layer separator of polyethylene/polypropylene, a three-layer separator of polyethylene/polypropylene/polyethylene, or a three-layer separator of polypropylene/polyethylene/polypropylene.

According to kinds of a separator used and an electrolyte used, lithium batteries can be categorized into a lithium ion battery, a lithium ion polymer battery, and a lithium polymer battery; according to a battery shape, lithium batteries can be categorized into a cylindrical battery, a rectangular battery, a coin-shape batter, or a pouch-shape batter; and according to a battery size, lithium batteries can be categorized into bulk-type batteries and thin-film type batteries. The lithium battery may also be a primary battery or a secondary battery.

The present embodiments will be described in further detail with reference to examples and comparative examples. The following examples are for illustrative purposes only and are not intended to limit the scope of the embodiments.

Synthesis Example 1

Preparation of Transition Metal Oxide $MoO_3$ transition metal oxide was heat treated at a temperature of 1000 to 1500° C. at a reducing atmosphere including a mixed gas of $H_2/N_2$ including 5 volume % of $H_2$ gas and 95 volume % of $N_2$ gas for 10 hours to prepare $MoO_2$ transition metal oxide.

The formation of the $MoO_2$ transition metal oxide having an oxidation number of four by reducing the $MoO_3$ transition metal oxide having an oxidation number of six was identified by X-ray diffraction analysis, and the results are shown in FIG. 1.

Example 1

Manufacturing of Lithium Battery

A positive active material was prepared by mixing 1 part by weight of the $MoO_2$ transition metal oxide prepared according to Synthesis Example 1 with 100 parts by weight of $LiCoO_2$. 94 wt. (weight) % of the prepared positive active material was mixed with 3 wt. % of Super P carbon black and 3 wt. % of PVDF to prepare a positive active material slurry composition, and then the slurry composition was coated on a current collector formed of an aluminum foil and dried to manufacture a positive electrode. Separately, about 3 wt. % of graphite powder, 3 wt. % of polyvinylidenefluoride (PVdF) as a binder, and N-methyl-2-pyrrolidone were mixed to prepare a negative active material slurry, and the prepared negative active material slurry was coated on a copper foil as a current collector to manufacture a negative electrode. A separator formed of polypropylene was interposed between the positive electrode and the negative electrode, and a non-aqueous electrolyte prepared by dissolving 1.50 mol/L of $LiPF_6$ in a mixed solvent including ethylenecarbonate and diethylcarbonate in a ratio of 3:7 was injected into the resultant structure, thereby completing manufacturing of a coin-shaped lithium battery.

Example 2

Manufacturing of Lithium Battery

A lithium battery was manufactured in the same manner as in Example 1, except that 5 parts by weight of the $MoO_2$ transition metal oxide prepared according to Synthesis Example 1 was mixed with 100 parts by weight of $LiCoO_2$.

Example 3

Manufacturing of Lithium Battery

A lithium battery was manufactured in the same manner as in Example 1, except that 10 parts by weight of the $MoO_2$ transition metal oxide prepared according to Synthesis Example 1 was mixed with 100 parts by weight of $LiCoO_2$.

Example 4

Manufacturing of Lithium Battery 1 part by weight of $MoO_2$ was dissolved in 100 ml of water to prepare a coating solution. 100 parts by weight of $LiCoO_2$ positive active material having an average particle diameter of 20 μm and 1 part by weight of an acetic acid were added to the coating solution so that $LiCoO_2$ positive active material particles were coated with $MoO_2$. The coated $LiCoO_2$ was dried at room temperature for 24 hours and heat treated at a temperature of 400° C. for 10 hours to prepare a positive active material. Then the same process as in Example 2 was performed to complete manufacturing a lithium battery.

Example 5

Manufacturing of Lithium Battery

A lithium battery was manufactured in the same manner as in Example 1, except that 5 parts by weight of the $MoO_2$ transition metal oxide prepared according to Synthesis Example 1 was mixed with 100 parts by weight of a mixture including $LiCoO_2$ and $Li_2NiO_2$ in a weight ratio of $LiCoO_2$ and $Li_2NiO_2$.

Comparative Example 1

Manufacturing of Lithium Battery Including Positive Active Material that does not Include Transition Metal Oxide A lithium battery was manufactured in the same manner as in Example 1, except that as the positive active material, only the $LiCoO_2$ positive active material was used and the transition metal oxide was not used.

Comparative Example 2

Manufacturing of Lithium Battery Including Positive Active Material that does not Include Transition Metal Oxide A lithium battery was manufactured in the same manner as in Example 5, except that as the positive active material, only 100 parts by weight of a mixture including $LiCoO_2$ and $Li_2NiO_2$ in a weight ratio of $LiCoO_2$ and $Li_2NiO_2$ was used and the transition metal oxide was not used.

Experimental Example 1

Differential Scanning Calorimetry (DSC) Evaluation Results

The coin-shaped lithium batteries manufactured according to Examples 1, 2, 3, and 4 were charged until a voltage reached 4.4 V, and then the charged batteries were dissembled to separate the positive active materials. Each of the obtained positive active materials was sampled together with a non-aqueous electrolyte in which 50 mol/L of $LiPF_6$ was dissolved and a mixed solvent including ethylenecarbonate and diethylcarbonate in a ratio of 3:7. A heat dissipation change of each sampled positive active material was evaluated using DSC (produced by TA Instruments Inc.) at a temperature of 50° C. to 375° C. in an $N_2$ atmosphere at a temperature increase rate of 10° C./min.

Figure 2:
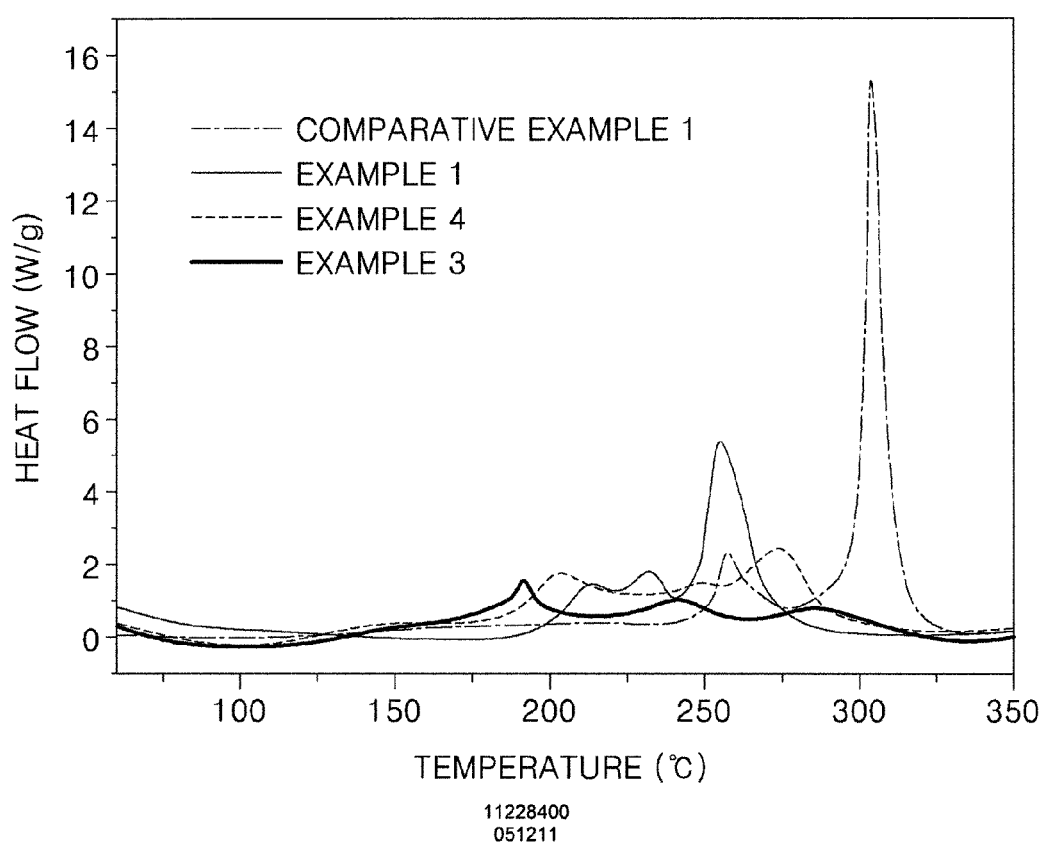
FIG. 2 is a graph showing DSC results of lithium batteries manufactured according to Examples 1, 3, 4 and Comparative Example 1.

The results are shown in Table 1, and also shown in FIG. 2 in which the results of the coin-type lithium battery of Example 2 are not included.

Experimental Example 2

Gas Generation Evaluation Results

In regard to the positive active material of Example 5, the corresponding lithium battery was charged until a voltage reached 4.4 V and then preserved at a temperature of 60° C. for 100 hours to measure the amount of gas generated in the lithium battery.

The results are shown in Table 1.

Experimental Example 3

Charge and Discharge Capacity Evaluation Results

The lithium batteries of Examples 1 through 5 were charged with a constant current of 160 mA/1 C until a voltage reached 4.4 V, and then charged with a constant voltage of 4.4

V until a current reached 1/20 C. Then, a charge capacity for each case was measured. Next, the batteries were discharged with a constant current of 160 mA/1 C until a voltage reached 4.4 V and a discharge capacity for each case was measured.

The results are shown in Table 1.

TABLE 1

|  | Heat dissipation change (J/g) | Amount of generated $O_2$ gas (cc/g) | Charge capacity (mAh/g) | Efficiency (%) |
| --- | --- | --- | --- | --- |
| Example 1 | 480 | — | 173 | 95 |
| Example 2 | 350 | — | 167 | 96 |
| Example 3 | 305 | — | 160 | 95 |
| Example 4 | 380 | — | 174 | 96 |
| Example 5 | — | 0.16 | 210 | 74 |
| Comparative Example 1 | 890 | — | 174 | 95 |
| Comparative Example 2 | — | 5.8 | 215 | 72 |

Referring to Table 1, heat dissipation changes of Examples 1 through 4 are reduced twice or more compared to that of Comparative Example 1.

In addition, referring to FIG. 2, a heat flow change of Comparative Example 1 was three to sixteen times greater than those of Examples 1, 3, and 4 at a high temperature of 250° C. or more.

In regard to Example 5 using the $Li_2NiO_2$-containing lithium composite oxide, the amount of generated $O_2$ gas was measured instead of the heat dissipation change.

As a result, it can be seen that the amount of generated $O_2$ gas of Example 5 was about 30 times smaller than that of generated $O_2$ gas of Comparative Example 2.

The results show that a lithium battery including a positive electrode for a lithium battery according to an embodiment has excellent high-temperature preservation characteristics and thermal stability.

While the present embodiments have been particularly shown and described with reference to exemplary embodiments thereof, it will be understood by those of ordinary skill in the art that various changes in form and details may be made therein without departing from the spirit and scope of the present embodiments as defined by the following claims.

What is claimed is:

1. A positive active material for a secondary lithium battery, comprising a lithium composite oxide and a transition metal oxide,
   wherein the transition metal oxide comprises a transition metal having an oxidation number smaller than the oxidation number the transition metal has when it is in its most stable state;
   wherein the transition metal oxide is present in admixture with the lithium composite oxide
   wherein the transition metal oxide is MoO2 and the lithium composite oxide is at least one selected from LiCoO2 and Li2NiO2,
   wherein the amount of the transition metal oxide is from about 0.1 to about 10 parts by weight based on 100 parts by weight of the lithium composite oxide.

2. The positive active material of claim 1, wherein at least a portion of the lithium composite oxide is coated with the transition metal oxide.

3. The positive active material of claim 1, wherein the transition metal in the transition metal oxide has an oxidation number of from about 2+ to about 5+.

4. The positive active material of claim 1, wherein amount of the transition metal oxide is from about 0.05 to about 15 parts by weight based on 100 parts by weight of the lithium composite oxide.

5. A secondary lithium battery comprising:
   a positive electrode comprising a positive active material,
   wherein the positive active material comprises a lithium composite oxide and a transition metal oxide,
   wherein the transition metal oxide comprises a transition metal having an oxidation number smaller than the oxidation number the transition metal has when it is in its most stable state,
   wherein the transition metal oxide is present in admixture with the lithium composite oxide
   wherein the transition metal oxide is MoO2 and the lithium composite oxide is at least one selected from LiCoO2 and Li2NiO2,
   wherein the amount of the transition metal oxide is from about 0.1 to about 10 parts by weight based on 100 parts by weights of the lithium composite oxide.

6. The secondary lithium battery of claim 5, wherein at least a portion of the lithium composite oxide is coated with the transition metal oxide.

7. The secondary lithium battery of claim 5, wherein the transition metal in the transition metal oxide has an oxidation number of from about 2+ to about 5+.

8. The secondary lithium battery of claim 5, wherein amount of the transition metal oxide may is from about 0.05 to about 15 parts by weight based on 100 parts by weight of the lithium composite oxide.

* * * * *